Oct. 27, 1959  R. J. HOVEY, JR  2,910,633
ELECTROLYTIC CAPACITOR
Filed Sept. 12, 1952
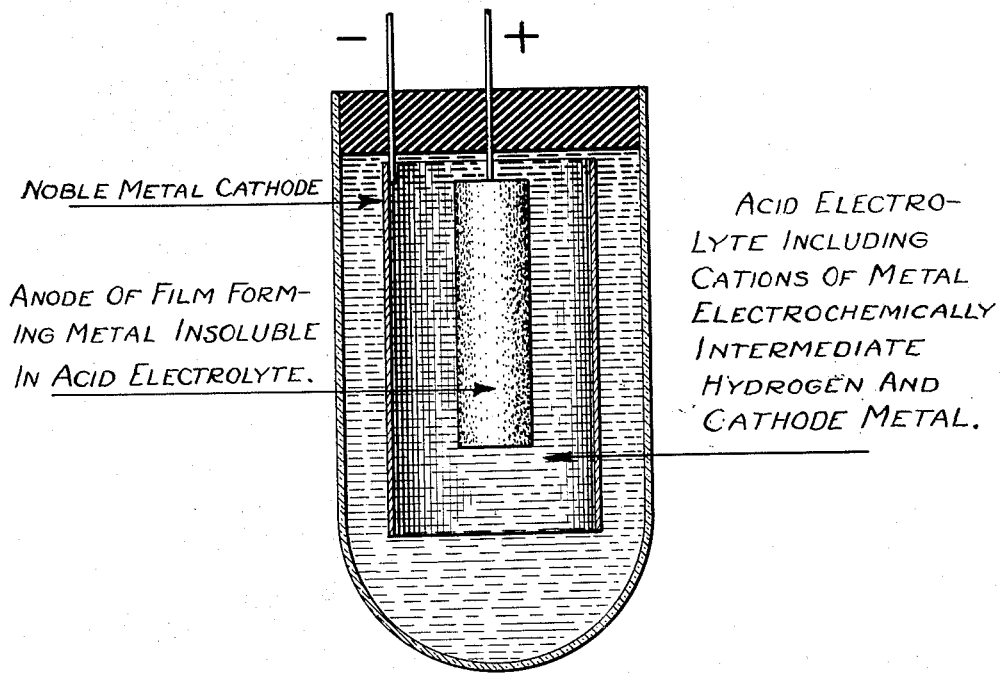
Inventor,
Ralph J. Hovey, Jr.
By: Schneider & Dressler,
Attys.

United States Patent Office 2,910,633
Patented Oct. 27, 1959

2,910,633

ELECTROLYTIC CAPACITOR

Ralph J. Hovey, Jr., Glen Ellyn, Ill., assignor to Fansteel Metallurgical Corporation, a corporation of New York Application September 12, 1952, Serial No. 309,181

13 Claims. (Cl. 317—230)

This invention relates to an electrolytic capacitor of the polarized type having a film-forming metal as anode, a noble metal or metal inert to the electrolyte as cathode, and a mineral acid electrolyte.

In the electrolytic capacitor of the present invention, the anode material may be a metal or alloy having a stable asymmetrically conducting film. Thus tantalum, columbium, vanadium, antimony, bismuth, magnesium and nickel may be used in any mineral acid electrolyte. Zinc, cadmium and iron may be used with fuming sulfuric acid. Because of the nature of the mineral acid electrolyte, the cathode material will be a noble metal or other metal chemically inert to the electrolyte. Such metals as silver, gold, platinum and titanium are examples of metals which may be used as cathodes in the capacitor embodying the present invention.

In a capacitor of the above type, particularly where the capacitor is sealed in a casing or container, it has been found that a phenomenon known in the trade as "aging" deleteriously affects the performance characteristics of the capacitor. This "aging" manifests itself in a reduction of the effective value of capacitance of the capacitor and also manifests itself by increasing the effective resistance of the capacitor in a circuit. Thus, "aging" results in an instability of capacitor characteristic and effectively reduces the operating life thereof.

I believe that a substantial factor in "aging" of an electrolytic capacitor of the type previously described is the direct-current leakage occurring when the capacitor is in a live circuit. When current leaks through the capacitor (the complete elimination of leakage current in an electrolytic capacitor is practically impossible), a certain amount of energy must be absorbed in the capacitor. In a capacitor having mineral acid as the electrolyte, as described above, substantially the only positive ions present in the electrolyte are hydrogen. The electrical energy absorbed or lost in the capacitor is utilized, at least in part, to dissociate hydrogen from the electrolyte and cause the hydrogen to evolve at the cathode. Generally, the hydrogen clings to the surface of the cathode and tends to reduce the effective area thereof. The presence of hydrogen at the cathode surface causes polarization and increases the effective resistance of the capacitor, and also reduces the effective cathode area of the capacitor. While a capacitor whose electrolyte and electrodes are open to the atmosphere may not suffer so much from this phenomenon, the effect is substantial and damaging in the case of a capacitor which is hermetically sealed to the atmosphere and which is designed to operate for long periods of time either on continuous or intermittent duty.

I have discovered that this aging of the capacitor will be substantially minimized, and even eliminated, by providing in the electrochemical system constituting the capacitor of my invention electrochemically active cations which prevent hydrogen ions from plating out or evolving at the cathode and, instead, are themselves plated out on the noble cathode metal when current conduction through the electrolyte occurs. It is essential that the electrochemically active cations can be plated out of an acid electrolyte and, after plating on the cathode, will form a layer of material having excellent electrical conductivity thereon. These requirements are met by certain metals electrochemically negative to the noble cathode metal. (The electrochemical positions of the metals are given in "Handbook of Chemistry and Physics," 28th ed., 1944, pages 1359–61, published by Chemical Rubber Publishing Co., Cleveland, Ohio.) The electrochemical position of such metals is such that the active certain metal or metals will have a preferential tendency to go into solution as ions, and a preferential tendency with respect to hydrogen to plate out on the cathode.

During use of the new capacitor in a circuit, I believe that the active cathode surface is a region where electrochemically active metal ions are continually going into and out of solution, and that the two processes are in equilibrium. During shelf life, the electrochemically active metal or metals will be substantially completely in solution as ions and have no adverse effect upon the capacitor characteristics.

The actual source of the electrochemically active metal ions may either be the pure metal or a metal salt or salts having the desired electrochemical properties. If a metal salt is used, then it can conveniently, though not necessarily, be the salt of the mineral acid electrolyte. Where a metal is polyvalent and has a number of such salts, as for example, the cuprous and cupric forms, it is immaterial which salt is used initially, providing the salt is soluble in the acid.

The metal salt must be soluble in the electrolyte and the nonmetallic component forming the anion must not be injurious to the capacitor. Any salt meeting these requirements may be used. Thus, the chlorides and sulphate of copper, zinc, nickel and cobalt, for example, may be used.

In order that the invention may be understood, it will now be explained in connection with the drawing, wherein a simple diagrammatic view of a polarized capacitor embodying the present invention is shown. No attempt is made to show any mechanical details either as to the electrode structure or as to the nature of the housing for the capacitor. The cathode may or may not form the housing for the electrolyte, as desired.

Referring to the drawing, the anode is of a suitably formed metal or alloy susceptible to use as a film-forming anode. Thus, it may be a metal or alloy having a stable asymmetrically conducting film, such as columbium, vanadium, antimony, bismuth, magnesium, nickel, etc. The preferred anode is tantalum having thereon the aforesaid conducting film. It is understood that the material of which the anode is made must be insoluble in the electrolyte. As an example, the anode may be a spongy mass of tantalum, having a suitable conducting film formed thereon, all this being well known in the art.

The electrolyte may be of any aqueous mineral acid, such as, for example, sulfuric acid, hydrochloric acid, phosphoric acid, or any mixture of such acids, providing the noble metal used as cathode is substantially insoluble in the electrolyte. It may have dissolved therein one or more of the mineral acid salts of the aforesaid electrochemically active metal ions. While nitric acid may be used as an electrolyte, it is generally preferred to use other mineral acids so that the selection of a noble metal will not be unduly limited. For example, silver is soluble in nitric acid and hence cannot be used as a cathode with such an electrolyte. However, nitric acid may be used as an electrolyte if a cathode of platinum is used. Various combinations of mineral acids may be used in order to obtain certain physical characteristics or properties. The electrolyte may have thickening agents such as gelatine added thereto, if desired.

The capacitor has a cathode of any desired form and area. This cathode may either form the housing for the capacitor or may be immersed in the electrolyte and have no housing function for the capacitor. Generally, the cathode will consist of a sheet of noble metal having an extended surface contacted by the electrolyte, said metal being insoluble in the electrolyte. Of the noble metals of which the cathode may consist, silver is preferred because of its cheapness and availability, as well as because it may be fabricated easily and has excellent electrical conductivity. In general, the other noble metals, such as platinum and gold, are generally equivalent to silver in the electrochemical consideration of the capacitor.

The capacitor includes a receptacle or housing either of the cathode metal or of separate material such as glass or other inert material. The finished capacitor may include a plug or seal of insulating material to seal the capacitor. Leads to the electrodes are provided.

The capacitor so far described is a conventional capacitor which, as has been previously pointed out, exhibits undesirable aging effects. In accordance with this invention, I introduce into this electrochemical system, cations of a metal or combination of metals, any one of which is electrochemically negative in respect to the noble cathode metal, and which is soluble in the acid electrolyte, and which in the electrochemical system of this invention has a preferential tendency with respect to hydrogen to plate out on the cathode. Of metals which may be used to furnish such cations, copper, zinc, nickel and cobalt are examples, copper being preferred.

The electrochemically active metals named are all generally soluble in various mineral acids. As an example, in an electrolytic capacitor, in accordance with the present invention, a tantalum anode, silver cathode, sulfuric acid electrolyte, and copper as the electrochemically active metal may be used. The acid concentration, amount of electrolyte and electrode area may be conventional.

The initial form in which the electrochemically active metal ion source is introduced into the system is immaterial. A coating of a particular metal, such as copper, for example, may be formed or created upon the cathode surface by electroplating, dipping the cathode in a solution, spraying the cathode, or the like. A separate piece of copper, for example, may be dropped into the electrolyte.

It is also possible to introduce the electrochemically active metal ion source into the system in the form of a corresponding salt of the electrolyte acid, and introduce the salt into the electrolyte. For example, to the acid electrolyte, such as sulfuric acid, there may be added a quantity of copper sulfate or zinc sulfate or the sulfate of any of the other metals specified. A mixture of salts of the different suitable metals may be used if desired. It is also possible to use the metal salt of a mineral acid different from the electrolyte acid. In such case, the anions due to the metal salt or salts will be different from the anions due to the electrolyte proper. The nitrate or chloride or mixture of the two may be used in a sulfuric acid electrolyte, as an example.

Salts of non-mineral acids may also be used where the salt is soluble in the electrolyte and where the presence of the anions in the electrolyte is not objectionable.

For example, in a conventional capacitor having a spongy tantalum anode and silver cathode with sulfuric acid electrolyte, I have found that from about 8 to about 26 grams of copper sulfate per liter of fill electrolyte will provide adequate copper to minimize aging. Such treated capacitors have been compared with and tested against identical untreated capacitors not having any added metal, as copper, for example. In an accelerated life test over 1,000 hours (equivalent to from about 3 to about 10 years of normal use), treated capacitors lost 5.1% in capacitance against 25% loss in untreated capacitors. The equivalent series resistance of the treated capacitors increased by 130% as against 300% for untreated capacitors.

In general, the amount of active metal, whose electrochemically active cation is to be formed in the electrolyte, should be small enough so that with the maximum concentration of the metal salt in solution, no undesirable precipitation will occur under extreme cold or other operating conditions where solubility may be decreased. So long as the desired character of the electrolyte remains substantially unimpaired, the amount of metal or metal salt introduced into the system is unimportant.

There is no definite minimum quantity of electrochemically active metal to be used in a capacitor in accordance with the present invention. As has been previously pointed out, direct-current leakage through the capacitor is related to the problem solved by the present invention; in general, the less the leakage current, the fewer the number of electrochemically active cations necessary in an electrolyte to perform the desired function.

The exact amount of leakage of a capacitor is difficult to predetermine with precision. The purity of the anode metal is an important factor in leakage characteristics. The physical form of the anode is also important. For example, in the case of tantalum, a spongy compressed mass of material is frequently used as an anode. The sponginess or density of this mass appears to be a factor in the continuity of the film formed thereon and of the leakage characteristics. The nature of the electrolyte, the nature of impurities and the amount of impurities therein also have some influence thereon. This includes impurities present in the cathode and dissolved by the electrolyte.

An excess of electrochemically active metal above the amount which will substantially eliminate aging is not objectionable, providing, as hereinbefore stated, that the physical properties of the electrolyte are not seriously impaired. It is understood, of course, that up to a certain point, any quantity of electrochemically active metal in the electrolyte will improve the aging behavior of the capacitor. With increase in the quantity of electrochemically active metal in the electrolyte, a corresponding decrease in aging characteristic of the capacitor results until what might be termed an efficacious maximum quantity of electrochemically active metal has been added to the electrolyte. After such maximum quantity has been added, any further addition of electrochemically active metal has negligible effect upon the aging characteristics of the capacitor and therefore represents a waste of such electrochemically active metal.

Where capacitors are being manufactured in quantity, a sample capacitor may be assembled and connected in a circuit so that a leakage current passes through the capacitor. While in circuit, sufficient electrochemically active metal or salt is added to the electrolyte until the evolution of hydrogen substantially ceases, thus determining a desirable measured quantity of electrochemically active metal to be added. The entire run of capacitors may now be made using the measured quantity of electrochemically active metal. Such a procedure will result in minimum addition of electrochemically active metal to the capacitor consistent with proper reduction in aging. As a rule, a new batch of anode material may make it desirable to run a new sample capacitor through test.

In the case of capacitors having small volume and using a comparatively small quantity of electrolyte, it may be preferable to plate the noble cathode metal with the desired electrochemically active metal. By control of the current density and duration of plating, the thinness of the active metal coating may be controlled to within accurate limits. For example, in the case of copper, a layer as thin as about one ten thousandth (0.0001) of an inch may be used.

If the active metal is introduced into the electrolyte in its metallic form as a coating on the cathode or as a discrete particle or as a sheet physically separate from the cathode, there will be an initial evolution of hydrogen. Prior to the sealing of the capacitor housing in the case of a hermetically sealed capacitor, the hydrogen is permitted to escape. The removal of the hydrogen may be accelerated by mechanical agitation of the electrolyte.

The term "metal ions" or "ions of metal" as used herein refers to the form in which a metal exists in an electrolyte when the metal or compound containing the metal is dissolved therein.

What is claimed is:

1. A polarized, sealed electrolytic capacitor comprising a mineral acid electrolyte, a cathode of a noble metal substantially insoluble in the electrolyte, and a tantalum anode, said electrolyte including ions of metal electrochemically negative to the cathode and which plate out preferentially with respect to hydrogen on the cathode.

2. The capacitor according to claim 1 wherein the metal of which the ions are formed is from the group consisting of copper, zinc, nickel and cobalt.

3. A polarized, sealed electrolytic capacitor comprising a mineral acid electrolyte which will not dissolve silver, a silver cathode in the electrolyte, and a tantalum anode, said electrolyte including ions of metal electrochemically negative to the cathode and which plate out preferentially with respect to hydrogen on the cathode.

4. The capacitor according to claim 3 wherein the metal of which the ions are formed is copper.

5. The capacitor according to claim 3 wherein the electrolyte includes sulfuric acid.

6. The capacitor according to claim 3 wherein the electrolyte is of sulfuric acid, and the metal for furnishing the ions is of copper.

7. A method of reducing aging of a noble cathode in a polarized, sealed electrolytic capacitor having a mineral acid electrolyte and an anode of film-forming metal substantially insoluble in the electrolyte, said method comprising introducing into the electrolyte ions of metal electrochemically negative to the cathode and which plate out preferentially with respect to hydrogen on the cathode and impressing rated voltage of the capacitor across said anode and said cathode to plate out said metal ions on the cathode.

8. A polarized, sealed electrolytic capacitor comprising a mineral acid electrolyte, a cathode of metal substantially insoluble in the electrolyte, and an anode of film-forming metal substantially insoluble in the electrolyte, said electrolyte including ions of nickel.

9. A polarized, sealed electrolytic capacitor comprising a mineral acid electrolyte, a cathode of metal substantially insoluble in the electrolyte, and an anode of film-forming metal substantially insoluble in the electrolyte, said electrolyte including ions of zinc.

10. A polarized, sealed electrolytic capacitor comprising a sulfuric acid electrolyte, a cathode of a noble metal substantially insoluble in the electrolyte, and an anode of film-forming metal substantially insoluble in the electrolyte, said electrolyte including the sulfate salt of a metal of the following group, copper, zinc, nickel and cobalt.

11. The capacitor according to claim 10 wherein the metal for the sulfate salt is copper.

12. A polarized, sealed electrolytic capacitor comprising a silver cathode and a tantalum anode in sulfuric acid electrolyte and copper sulfate in said electrolyte.

13. A polarized, sealed electrolytic capacitor comprising a mineral acid electrolyte, a cathode of a noble metal substantially insoluble in the electrolyte, and an anode of a film-forming metal substantially insoluble in the electrolyte, said electrolyte including ions of a metal electrochemically negative to the cathode and which plate out preferentially with respect to hydrogen on the cathode.

References Cited in the file of this patent

UNITED STATES PATENTS

| 1,680,210 | Engle | Aug. 7, 1928 |
| 2,616,953 | Booe | Nov. 4, 1952 |
| 2,617,863 | Stinson | Nov. 11, 1952 |

OTHER REFERENCES

Electrical Manufacturing, vol. 46, Issue 6, published December 1950, pages 82 to 85.